United States Patent
Cheney et al.

(10) Patent No.: US 6,361,444 B1
(45) Date of Patent: Mar. 26, 2002

(54) FLEXIBLE BOOT ASSEMBLY FOR A CONSTANT VELOCITY JOINT

(75) Inventors: Christopher C. Cheney, Bowling Green, OH (US); Jeffrey M. Knodle, Ida, MI (US)

(73) Assignee: GKN Automotive, Inc., Auburn Hills, MI (US)

( * ) Notice: Subject to any disclaimer, the term of this patent is extended or adjusted under 35 U.S.C. 154(b) by 0 days.

(21) Appl. No.: 09/145,356

(22) Filed: Sep. 1, 1998

(51) Int. Cl.⁷ .................................. F16D 3/84
(52) U.S. Cl. ...................... 464/175; 277/636
(58) Field of Search ................. 464/173, 174, 464/175; 74/18; 277/634, 635, 636; 285/235; 403/50, 51; 428/36.9

(56) References Cited

U.S. PATENT DOCUMENTS

| | | | |
|---|---|---|---|
| 2,863,336 A | * 12/1958 | Parstorfer | 74/18 X |
| 3,404,573 A | 10/1968 | Cull et al. | |
| 3,583,244 A | 6/1971 | Teinert | |
| 3,683,421 A | * 8/1972 | Martinie | 277/636 X |
| 3,688,523 A | * 9/1972 | Schafer | 464/175 |
| 4,145,896 A | * 3/1979 | Pringle | 464/175 X |
| 4,327,925 A | * 5/1982 | Alexander et al. | 277/636 |
| 4,369,979 A | 1/1983 | Krude et al. | |
| 4,747,805 A | 5/1988 | Welschorf | |
| 4,991,457 A | 2/1991 | Chen | |
| 5,297,996 A | * 3/1994 | Draga | |
| 5,318,480 A | 6/1994 | Essi et al. | |
| 5,525,112 A | 6/1996 | Smith | |
| 5,615,576 A | * 4/1997 | Kataumi et al. | 74/18 X |
| 5,853,178 A | * 12/1998 | Wydra et al. | 464/175 X |
| 5,961,155 A | * 10/1999 | Youngs | 277/634 X |
| 6,093,108 A | * 7/2000 | Moulinet | 464/173 |
| 6,227,748 B1 | * 5/2001 | Hayward et al. | 403/50 |

FOREIGN PATENT DOCUMENTS

GB 2086534 * 5/1982 .................. 464/175

* cited by examiner

Primary Examiner—Lynne H. Browne
Assistant Examiner—Greg Binda
(74) Attorney, Agent, or Firm—MacMillan, Sobanski & Todd, LLC

(57) ABSTRACT

A flexible boot assembly for protectively covering a constant velocity joint includes a flexible boot having an end portion that is molded about a flange portion of a rigid can. The flexible boot is preferably formed from an elastomeric material and can be integrally molded to a metallic can by an insert molding or other similar process. The metallic can includes a hollow cylindrical flange portion for positioning the can with respect to the constant velocity joint. The metallic can also includes a face portion having a plurality of apertures formed therethrough for mounting the boot assembly to the constant velocity joint. The inner surface of the metallic can includes a bead of a sealing material or a gasket for sealingly engaging the boot assembly to the adjacent face of the constant velocity joint. In another embodiment, the entire boot assembly is formed by using elastomeric material. In alternative embodiments, the entire boot assembly is formed from an elastomeric material. The boot assembly may or may not include the hollow cylindrical flange portion for positioning it with respect to the constant velocity joint.

10 Claims, 4 Drawing Sheets

FLEXIBLE BOOT ASSEMBLY FOR A CONSTANT VELOCITY JOINT

BACKGROUND OF THE INVENTION

This invention relates in general to constant velocity joints and in particular to an improved structure for a flexible boot assembly adapted to protectively cover a constant velocity joint.

In most land vehicles in use today, a driveshaft assembly is provided for transmitting rotational power from an output shaft of an engine/transmission assembly to an input shaft of an axle assembly so as to rotatably drive one or more wheels of the vehicle. A typical driveshaft assembly includes a hollow cylindrical driveshaft tube having first and second universal joints connected to the ends thereof. The first universal joint is connected between the output shaft of the engine/transmission assembly and the first end of the driveshaft tube, while the second universal joint is connected between the second end of the driveshaft tube and the input shaft of the axle assembly. The universal joints provide a rotational driving connection from the output shaft of the engine/transmission assembly through the driveshaft tube to the input shaft of the axle assembly, while accommodating a limited amount of misalignment between the rotational axes of these three shafts.

Universal joints are commonly classified by their operating characteristics. One important operating characteristic relates to the relationship between the instantaneous angular velocities of the two shafts that are connected together through the universal joint. In a constant velocity type of universal joint, the instantaneous angular velocities of the two shafts are always equal, regardless of the relative angle at which the two shafts are oriented. In a non-constant velocity type of universal joint, the instantaneous angular velocities of the two shafts may vary with this relative angle, although the average angular velocities for one complete rotation are equal.

A typical structure for a constant velocity joint includes a hollow outer race that is connected to one of the shafts and an inner race disposed within the outer race that is connected to the other of the shafts. The inner surface of the outer race and the outer surface of the inner race have respective pluralities of grooves formed therein. Each groove formed in the inner surface of the outer race is associated with a corresponding groove formed in the outer surface of the inner race, and a ball is disposed in each of the associate pairs of grooves. The balls provide a driving connection between the outer and inner races such that rotation of one of the one of the shafts results in rotation of the outer race, the inner race, and the other of the shafts. An annular cage is typically provided between the outer and inner races for retaining the balls in the grooves. The cage is provided with a plurality of circumferentially spaced openings for receiving and retaining the balls.

In order to protectively cover the various components of the constant velocity joint from dirt, water, and other contaminants, and further to retain an adequate amount of lubricant therein, it is known to provide a flexible boot thereabout. A typical flexible boot includes a first relatively large end that is secured to the outer race of the constant velocity joint and a second relatively small end that is secured to the shaft extending from the inner race of the constant velocity joint. Usually, the boot is formed from a rubber or plastic material having a plurality of bellows-shaped convolutions formed therein to accommodate angular movement of the shaft relative to the outer race. When installed about the constant velocity joint, the flexible boot functions to protectively cover the various components of the constant velocity joint from dirt, water, and other contaminants, and further to retain an adequate amount of lubricant therein.

Several structures are known in the art for securing the ends of the flexible boot to the associated components of the constant velocity joint. Typically, the relatively small end of the flexible boot is secured to the shaft extending from the inner race of the constant velocity joint by an annular band clamp. The band clamp extends concentrically about the co-axially overlapping portions of the flexible boot and the shaft so as to frictionally retain the relatively small end of the flexible boot thereon. In some instances, the relatively large end of the flexible boot is secured to the outer circumferential surface of the outer race of the constant velocity joint in a similar manner. Alternatively, it is known to secure the relatively large end of the flexible boot to an axial face of the outer race using an annular retaining ring and a plurality of threaded fasteners. Although both of these structures function satisfactorily, it has been found that they may undesirably limit the maximum operating angles accommodated by the constant velocity joint in some instances. Thus, it would be desirable to provide an improved structure for a flexible boot assembly adapted to protectively cover a constant velocity joint.

SUMMARY OF THE INVENTION

This invention relates to an improved structure for a flexible boot assembly adapted to protectively cover a constant velocity joint. In a first embodiment of the invention, the boot assembly includes a flexible boot having an end portion that is molded about a flange portion of a rigid can. The flexible boot is preferably formed from an elastomeric material and can be integrally molded to a metallic can by an insert molding or other similar process. The metallic can includes a hollow cylindrical flange portion for positioning the can with respect to the constant velocity joint. The metallic can also includes a face portion having a plurality of apertures formed therethrough for mounting the boot assembly to the constant velocity joint. The inner surface of the metallic can includes a bead of a sealing material or a gasket for sealingly engaging the boot assembly to the adjacent face of the constant velocity joint. In another embodiment, the entire boot assembly is formed by using elastomeric material. In a second embodiment, the entire boot assembly is formed from an elastomeric material. The boot assembly may or may not include the hollow cylindrical flange portion for positioning it with respect to the constant velocity joint.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
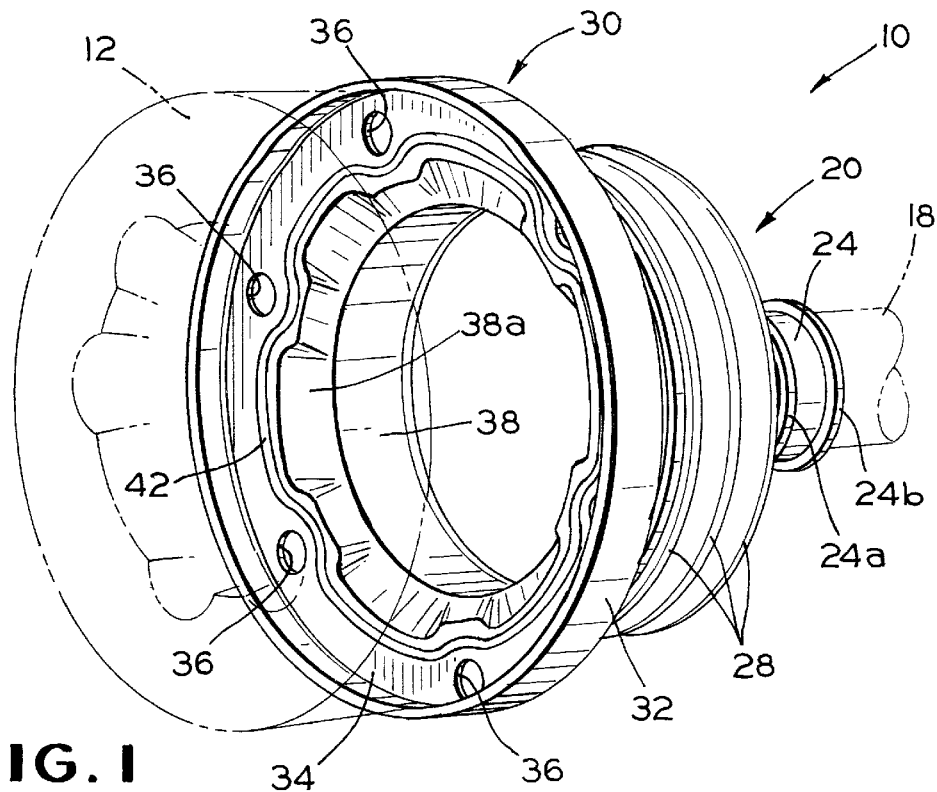
FIG. 1 is a perspective view of a first embodiment of a flexible boot assembly for a constant velocity joint in accordance with this invention.
Figure 2:
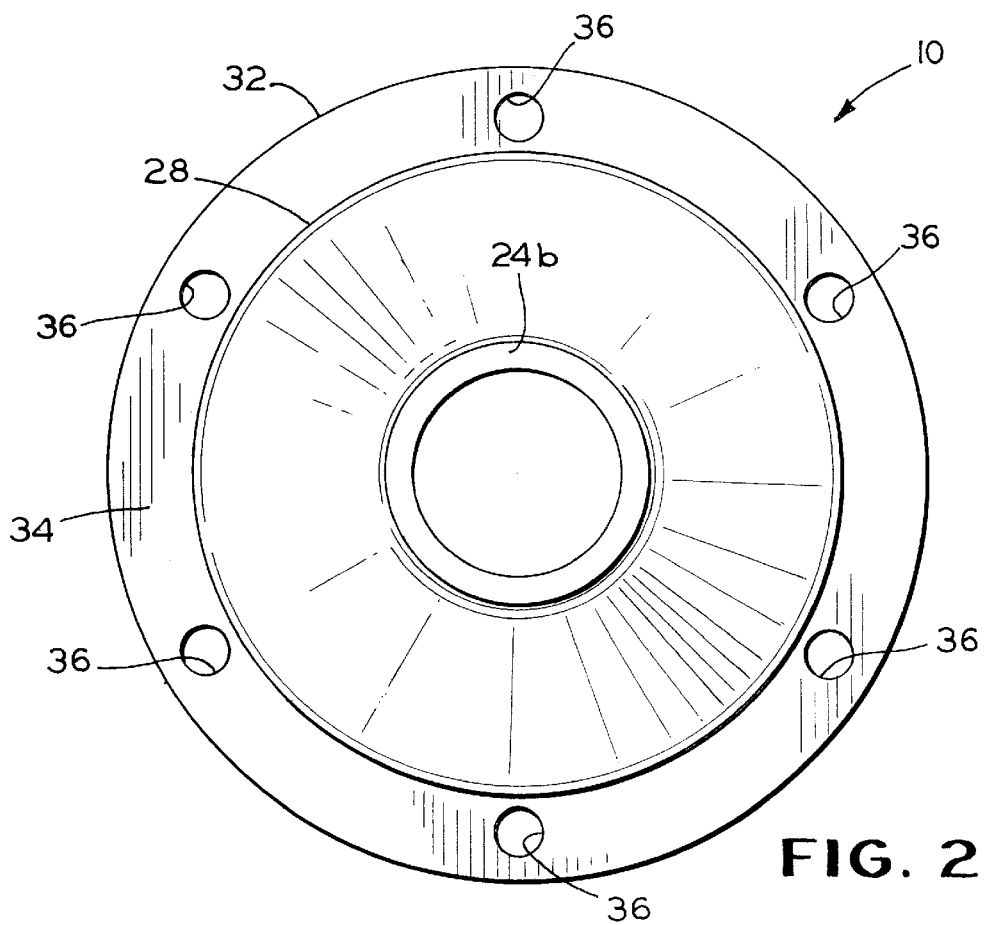
FIG. 2 is an opposite end elevational view of the flexible boot assembly illustrated in FIG. 1.
Figure 3:
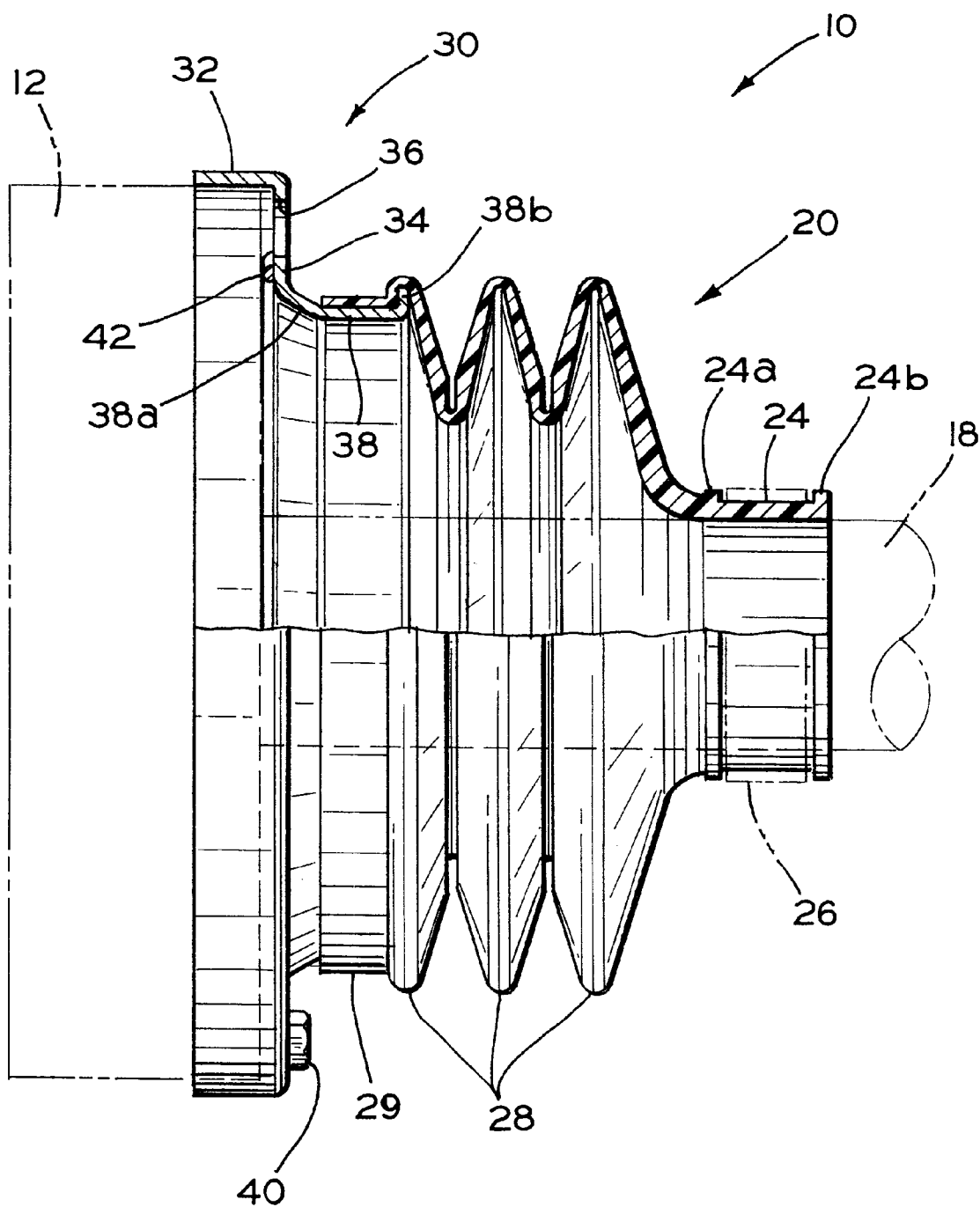
FIG. 3 is a sectional elevational view of the flexible boot assembly illustrated in FIGS. 1 and 2.

Referring now to the drawings, there is illustrated in FIGS. 1, 2, and 3 a first embodiment of a boot assembly, indicated generally at 10, for use with a constant velocity joint in accordance with this invention. Because the constant velocity joint is conventional in the art and forms no part of this invention, only those portions of the constant velocity joint that are necessary for a full understanding of this invention have been illustrated. The constant velocity joint includes a hollow outer race 12 and an inner race (not shown) that is disposed within the outer race 12. The inner surface of the outer race and the outer surface of the inner race have respective pluralities of grooves formed therein. Each groove formed in the inner surface of the outer race is associated with a corresponding groove formed in the outer surface of the inner race, and a ball (not shown) is disposed in each of the associate pairs of grooves. The balls provide a driving connection between the outer and inner races such that rotation of a first shaft (not shown) connected to the outer race 12 results in rotation of the outer race, the inner race, and a second shaft 18 connected to the inner race. An annular cage (not shown) is typically provided between the outer and inner races for retaining the balls in the grooves. The cage is provided with a plurality of circumferentially spaced openings for receiving and retaining the balls.

The boot assembly 10 includes a flexible boot, indicated generally at 20, and a rigid can, indicated generally at 30. The flexible boot 20 is preferably formed from a flexible rubber or plastic material, such as HYTREL®, a registered trademark of the E. I. Du Pont de Nemours & Company for polyester elastomers. The flexible boot 20 includes a relatively small hollow cylindrical end portion 24 that is sized to fit snugly about the shaft 18. A metal band clamp 26 or other retaining structure can be provided to secure the cylindrical end portion 24 of the flexible boot 20 to the shaft 18. If desired, the outer circumferential surface of the cylindrical end portion 24 of the flexible boot 20 may have a pair of spaced apart annular ridges 24a and 24b formed thereon for receiving the band clamp 26 therebetween. The flexible boot 20 has a plurality of bellows-like convolutions 28 formed in the central portion thereof to facilitate flexing during use. Although three of such convolutions 28 are illustrated, it will be appreciated that any desired number of such convolutions 28 may be provided. The flexible boot 20 further includes a relatively large hollow cylindrical end portion 29.

The can 30 is preferably formed from a metallic or other rigid material and may be formed into a desire shape using by stamping or any other conventional metal working process. The can 30 includes a hollow cylindrical flange portion 32 that is sized to fit snugly about the outer circumferential surface of the outer race 12 of the constant velocity joint. The can 30 also includes a face portion 34 that extends radially inwardly from the flange portion 32. A plurality of apertures 36 are formed through the face portion 34 of the can 30. In the illustrated embodiment, six equidistantly spaced apertures 36 are formed through the face portion 34 of the can 30. However, it will be appreciated that the number and locations of such apertures 36 can be varied as desired. The apertures 36 are preferably aligned with threaded bores (not shown) formed in the outer race 12 of the constant velocity joint. The can 30 further includes a hollow cylindrical flange portion 38 that extends axially from the inner end of the face portion 34. If desired, the transition from the face portion 34 to the flange portion 38 may be tapered somewhat, such as shown at 38a. Also, an annular ridge 38b may be formed at or near the end of the flange portion 38, for a purpose that will be explained below.

The boot assembly 10 is preferably formed by molding the flexible boot 20 about the flange portion 38 of the rigid can 30. This can be accomplished by any known molding process. The annular ridge 38b formed on the flange portion 38 provides a positive surface about which the relatively large hollow cylindrical end portion 29 of the flexible boot 20 can be molded. Thus, the annular ridge 38b functions to positively retain the relatively large hollow cylindrical end portion 29 of the flexible boot 20 on the flange portion 38 of the rigid can 30. Also, the hollow cylindrical end portion 29 of the flexible boot 20 seals against the cylindrical flange portion 38 of the rigid can 30 to prevent dirt, water, and other contaminants from entering into the boot assembly 10.

The rigid can 30 of the boot assembly 10 can be secured to the outer race 12 of the constant velocity joint by a plurality of threaded fasteners, one of which is shown at 40 in FIG. 3. The threaded fastener 40 extends through one of the apertures 36 formed through the face portion 34 of the can 30 and into threaded engagement with the threaded bore formed in the outer race 12. Preferably, a bead 42 of a sealing material (or a gasket) is provided on the inner surface of the face portion 34 of the rigid can 30 for sealing against the axially facing surface of the outer race 12 of the constant velocity joint to prevent dirt, water, and other contaminants from entering into the boot assembly 10.

Figure 4:
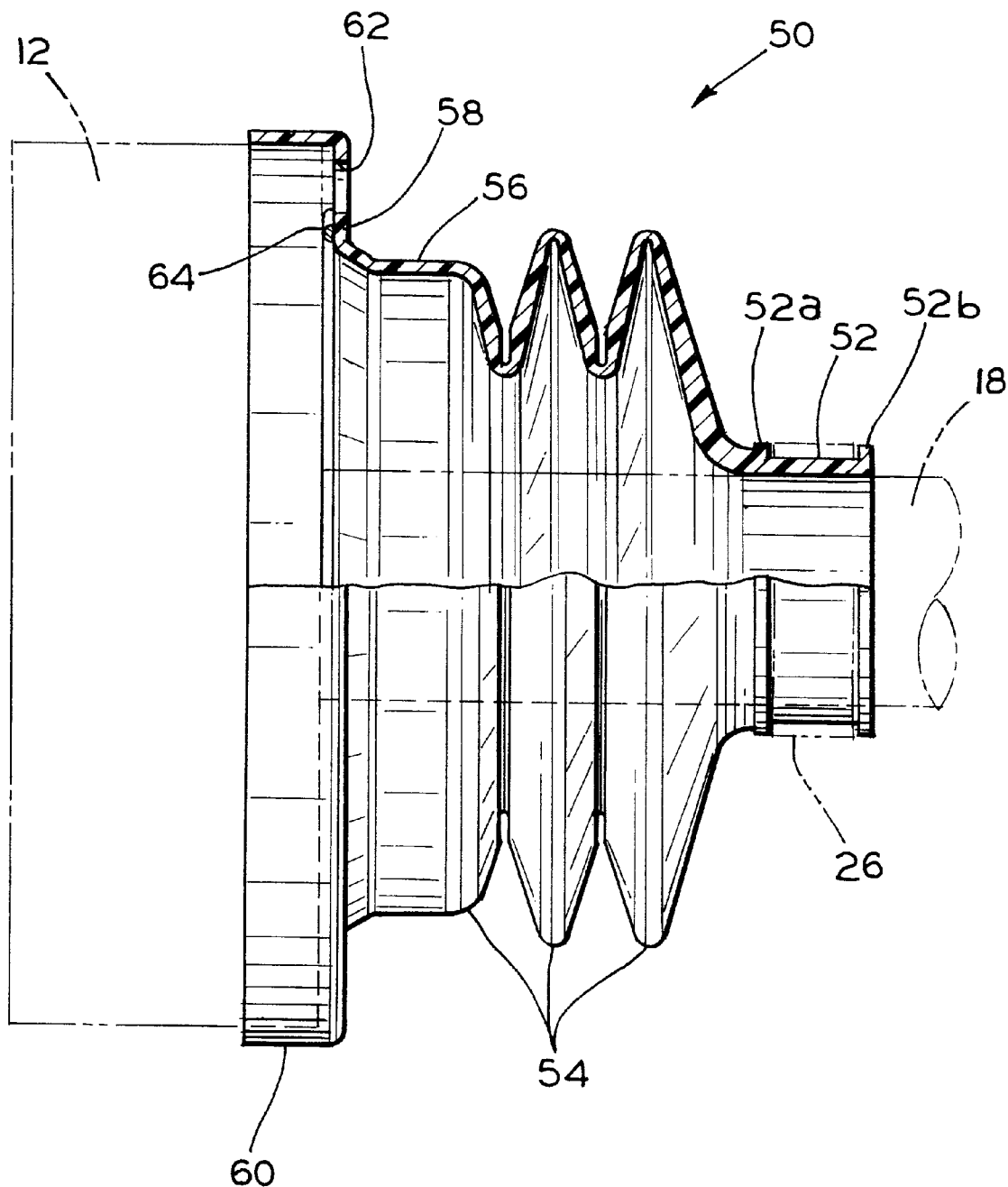
FIG. 4 is a sectional elevational view similar to FIG. 1 of a second embodiment of a flexible boot assembly for a constant velocity joint in accordance with this invention.

Referring now to FIG. 4, there is illustrated a second embodiment of a boot assembly, indicated generally at 50, for use with a constant velocity joint in accordance with this invention. The boot assembly 50 is formed completely from a flexible rubber or plastic material, such as described above and includes a relatively small hollow cylindrical end portion 52 that is sized to fit snugly about the shaft 18. The above-mentioned band clamp 26 or other retaining structure can be provided to secure the cylindrical end portion 52 of the flexible boot 50 to the shaft 18. If desired, the outer circumferential surface of the cylindrical end portion 52 of the flexible boot 50 may have a pair of spaced apart annular ridges 52a and 52b formed thereon for receiving the band clamp 26 therebetween. The flexible boot 50 has a plurality of bellows-like convolutions 54 formed in the central portion thereof to facilitate flexing during use. Although three of such convolutions 54 are illustrated, it will be appreciated that any desired number of such convolutions 54 may be provided.

The flexible boot 50 also includes a can portion including a hollow cylindrical portion 56 that is formed integrally with and extends axially from the convolutions 54, a face portion 58 that is formed integrally with and extends radially outwardly from the hollow cylindrical portion 56, and a hollow cylindrical flange portion 60 that is formed integrally with and extends axially from the face portion 58. The hollow cylindrical flange portion 60 is sized to fit snugly about the outer circumferential surface of the outer race 12 of the constant velocity joint. A plurality of apertures 62 are formed through the face portion 58 of the flexible boot 50. In the illustrated embodiment, six equidistantly spaced apertures 62 are formed through the face portion 58 of the flexible boot 50. However, it will be appreciated that the number and locations of such apertures 62 can be varied as desired. The apertures 62 are provided for the same purpose as the apertures 36 discussed above. Preferably, a bead 64 of a sealing material (or a gasket) is provided on the inner surface of the face portion 58 of the flexible boot 50 for sealing against the axially facing surface of the outer race 12 of the constant velocity joint to prevent dirt, water, and other contaminants from entering into the boot assembly 50.

Figure 5:
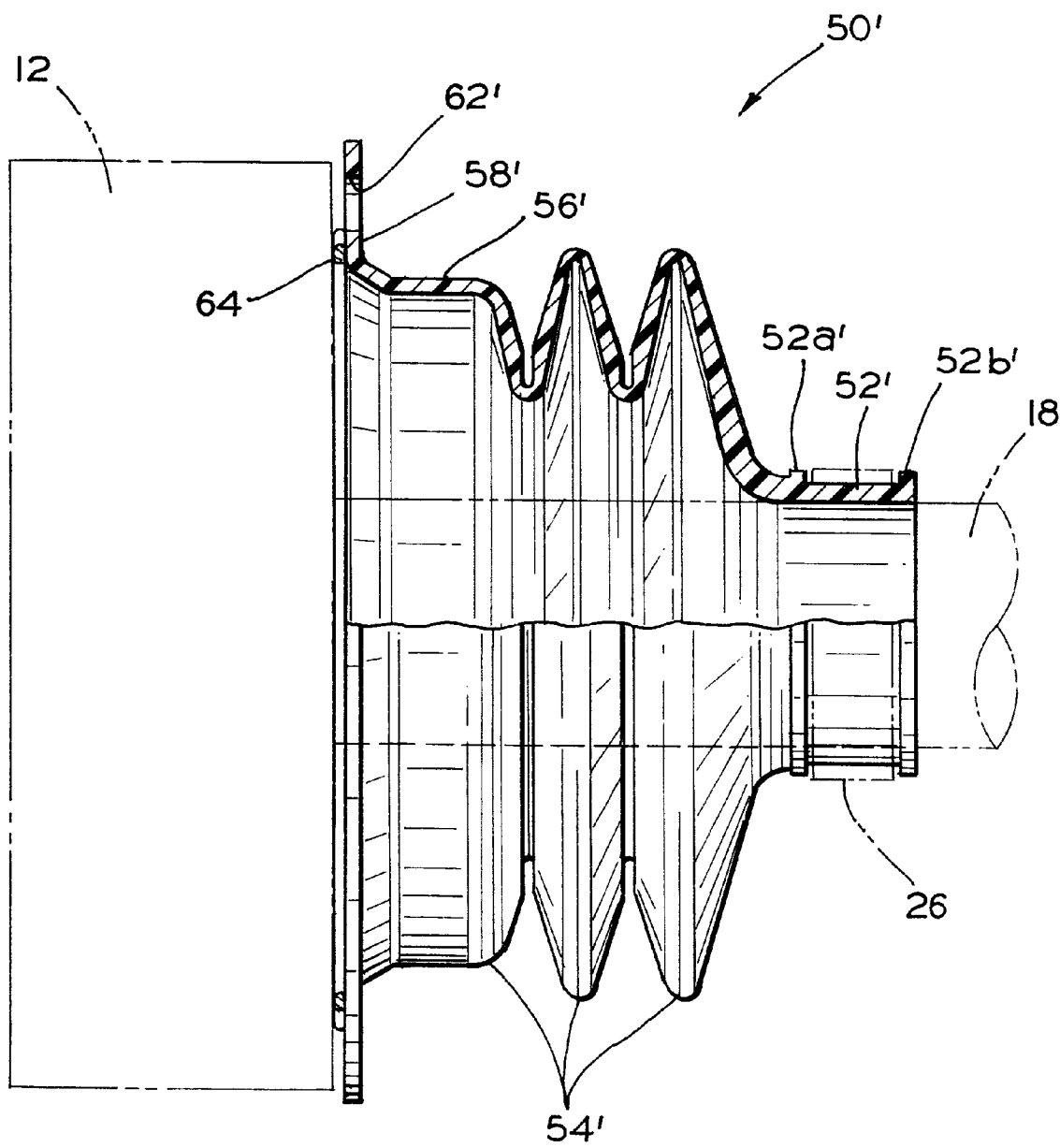
FIG. 5 is a sectional elevational view similar to FIG. 1 of a third embodiment of a flexible boot assembly for a constant velocity joint in accordance with this invention.

Referring now to FIG. 5, there is illustrated a third embodiment of a boot assembly, indicated generally at 50', for use with a constant velocity joint in accordance with this invention. The boot assembly 50' is similar to the boot assembly 50 described above, and like reference numbers are used to identify similar components. The boot assembly 50' is identical to the boot assembly 50 described above, except that it does not include the hollow cylindrical flange portion 60. Thus, the bead 64' of the sealing material provides the sole seal against the axially facing surface of the outer race 12 of the constant velocity joint to prevent dirt, water, and other contaminants from entering into the boot assembly 50'.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A constant velocity joint comprising:

first and second members connected together for relative angular movement and for concurrent constant velocity rotational movement;

a rigid can including a first axially extending portion engaged with said first member, a radially extending portion extending orthogonally from said first axially extending portion and engaged with said first member, and a second axially extending portion extending from said radially extending portion; and a flexible boot including a first end portion that is secured to said second axially extending portion of said can, an intermediate portion extending from said first end portion and having a plurality of axially extending convolutions formed therein, and a second end portion extending from said intermediate portion and secured to said second member.

2. The constant velocity joint defined in claim 1 wherein said can and said boot are formed from different materials.

3. The constant velocity joint defined in claim 1 wherein said can and said boot are formed from the same material.

4. The constant velocity joint defined in claim 1 wherein said can has an aperture formed therethrough to facilitate securement of said can to said first member.

5. The constant velocity joint defined in claim 1 wherein said can has a plurality of apertures formed therethrough to facilitate securement of said can to said first member.

6. The constant velocity joint defined in claim 1 wherein said can has an aperture formed through said radially extending portion thereof to facilitate securement of said can to said first member.

7. The constant velocity joint defined in claim 1 wherein said can has a plurality of apertures formed through said radially extending portion thereof to facilitate securement of said can to said first member.

8. The constant velocity joint defined in claim 1 wherein said can includes a tapered portion extending between said radially extending portion and said second axially extending portion.

9. The constant velocity joint defined in claim 1 further including an annular ridge formed about said second end portion.

10. The constant velocity joint defined in claim 1 further including a pair of spaced apart annular ridges formed about said second end portion.

\* \* \* \* \*